United States Patent [19]

Rogers et al.

[11] Patent Number: 5,592,383
[45] Date of Patent: Jan. 7, 1997

[54] WHEEL ALIGNER CORDLESS COMMUNICATIONS UNIT

[75] Inventors: Steven W. Rogers, Conway; David R. Coburn, Maumelle, both of Ark.

[73] Assignee: FMC Corporation, Chicago, Ill.

[21] Appl. No.: 301,455

[22] Filed: Sep. 7, 1994

[51] Int. Cl.[6] .................................................. G01B 7/315
[52] U.S. Cl. .................................. 364/424.034; 364/559; 33/286; 356/138
[58] Field of Search ........................ 364/424.01, 424.03, 364/559; 33/286, 288; 379/56, 58, 60; 455/73; 356/138, 139.09, 152.1

[56] References Cited

U.S. PATENT DOCUMENTS

| | | | |
|---|---|---|---|
| 4,761,749 | 8/1988 | Titsworth et al. | 364/559 |
| 4,931,964 | 6/1990 | Titsworth et al. | 364/559 |
| 5,115,463 | 5/1992 | Moldavsky et al. | 379/58 |
| 5,396,541 | 3/1995 | Farwell et al. | 379/60 |

Primary Examiner—Collin W. Park
Attorney, Agent, or Firm—Henry C. Query, Jr.

[57] ABSTRACT

A wheel aligner comprises a communications unit attachable to the conventional heads and the console to provide for cordless communication of information between the heads and the console in the absence of cables.

6 Claims, 3 Drawing Sheets

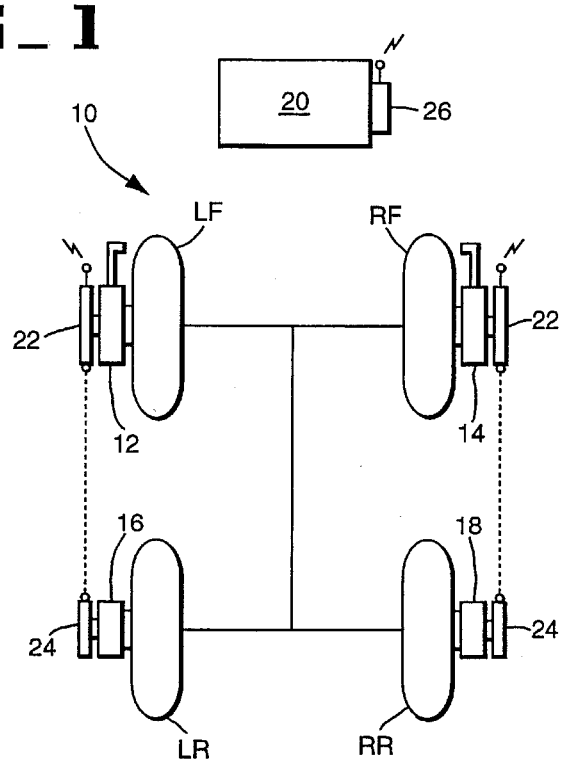
FIG_1
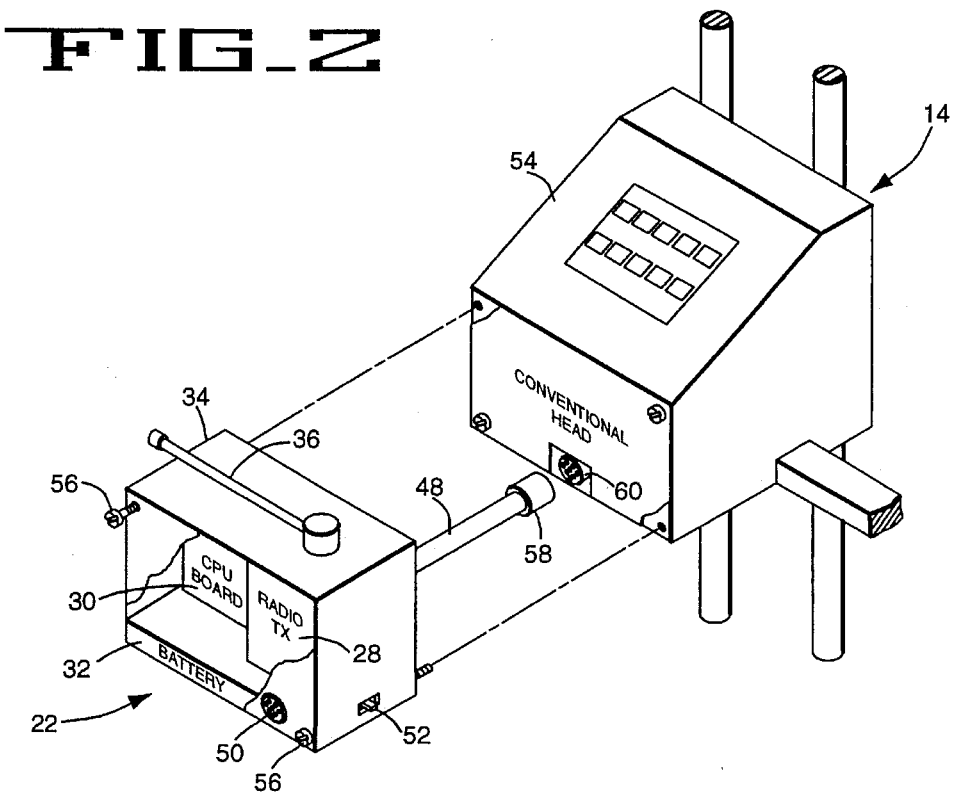
FIG_2

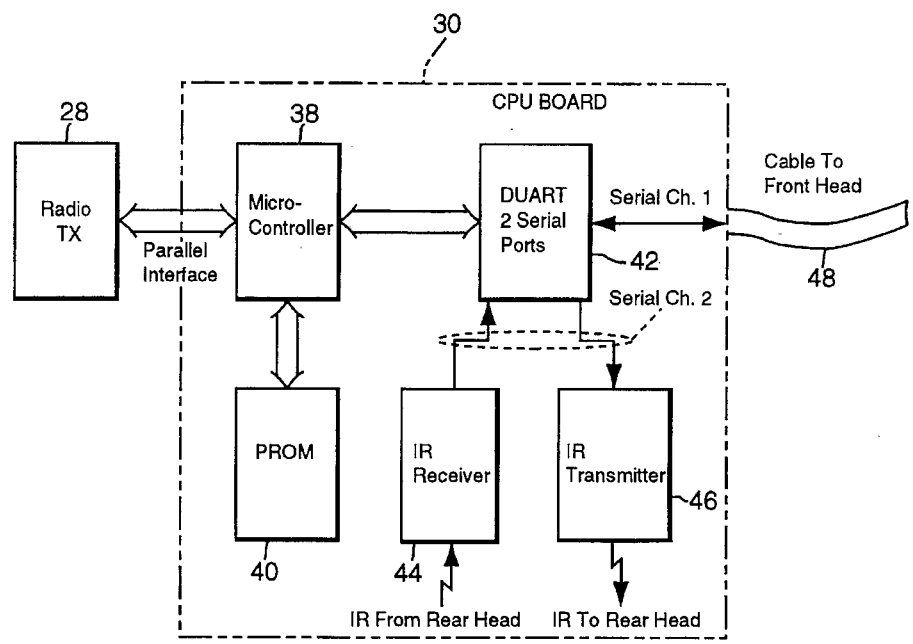
FIG_3
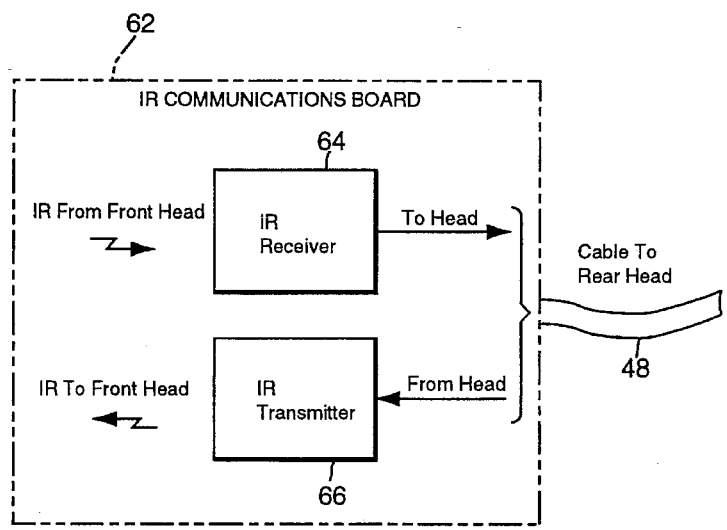
FIG_4

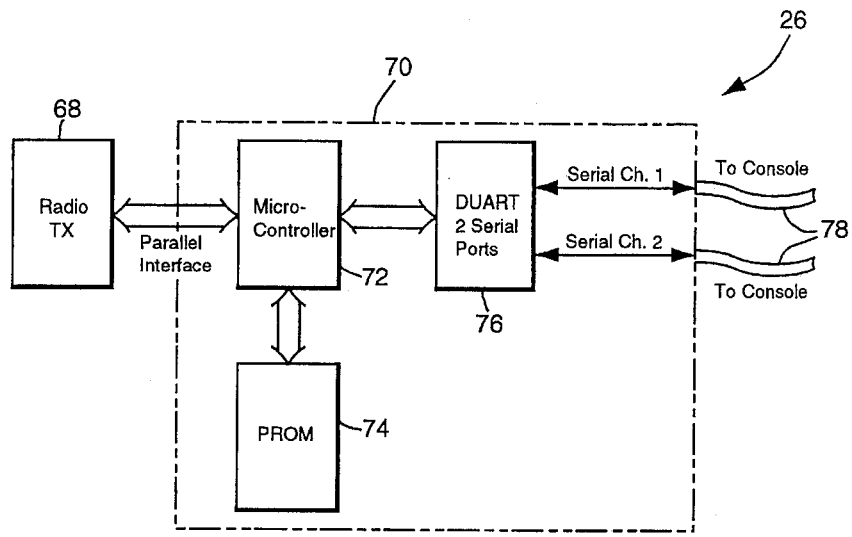
FIG_5
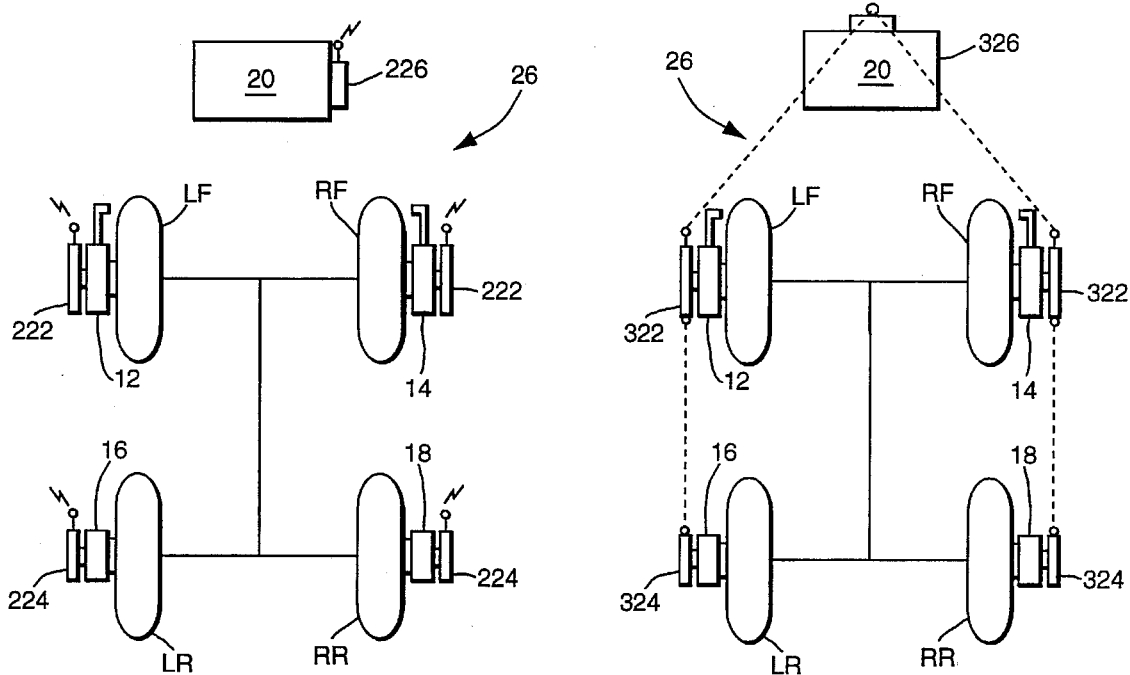
FIG_6 FIG_7

WHEEL ALIGNER CORDLESS COMMUNICATIONS UNIT

BACKGROUND OF THE INVENTION

1. Field of the Invention

The present invention relates to a vehicle wheel aligner and, more particularly, to a communications unit which is attachable to the conventional heads of a wheel aligner and provides for cordless communication of information between the heads and the console of the aligner.

2. Description of Related Art

Vehicle wheel aligners are well known in the art. Such aligners typically comprise four alignment heads which are mountable on the vehicle wheels and include sensors for generating signals representative of the angular orientations of the wheels. The data generated by the sensors is transmitted, in either unprocessed or pre-processed form, to a computer processor means located in a central console. The processor means processes the data according to preprogrammed instructions and displays alignment information for the vehicle on a video display. In addition, the processor means controls the data gathering operation by transmitting appropriate instructions to the heads.

In conventional wheel aligners, data and instructions are communicated between the console and the heads via electrical cables, or cords. However, some newer wheel aligners employ cordless communications means, such as infrared or radio frequency transceivers, to communicate the data and instructions between the heads and the console in accordance with the teachings of U.S. Pat. No. 4,761,749 to Titsworth et al., which is owned by the assignee hereof. Titsworth et al. disclose a wheel aligner comprising heads having integral cordless transceiver means connected to the sensors and a console having integral cordless transceiver means connected to the processor means. While the advantages of eliminating the cords between the console and the heads are many, heads comprising integral cordless transceiver means are significantly more costly to manufacture. This typically makes the cost of a cordless aligner much greater than the cost of a conventional aligner. In addition, a conventional aligner can usually be upgraded to a cordless aligner only by replacing each conventional head with a cordless head, thus often making the upgrade cost-prohibitive.

SUMMARY OF THE INVENTION

Therefore, it is an object of the present invention to provide an apparatus and method for converting a conventional wheel aligner into a cordless wheel aligner.

According to the present invention, these and other objects and advantages are achieved by providing cordless communications units which are attachable to the console and each head of a conventional aligner and comprise cordless transceiver means for communicating data and instructions between the console and the heads. In one embodiment of the invention, separate cordless communications units are provided for each of the front heads, the rear heads and the console. The cordless communications unit for each of the front heads comprises a battery power supply; a radio transceiver for communicating sensor data and instructions between the head and the console; an infrared transceiver for communicating data and instructions between the unit and a cordless communications unit mounted on the longitudinally adjacent rear head; a microcontroller for translating the data and instructions between formats compatible with the radio transceiver and the front and rear heads; and a dual universal asynchronous receiver/transmitter for coordinating the communication of data and instructions between the microcontroller, the front head and the infrared transceiver. The cordless communications unit for each of the rear heads comprises a battery power supply and an infrared transceiver for communicating data and instructions between the rear head and the cordless communications unit mounted on the longitudinally adjacent front head. Finally, the cordless communications unit for the console comprises a battery power supply; a radio transceiver for communicating information between the console and the cordless communications units mounted on the front heads; a microcontroller for translating the data and instructions between formats compatible with the radio transceiver and the console; and a dual universal asynchronous receiver/transmitter for coordinating the communication of data and instructions between the microcontroller and the console.

In this embodiment, the console cordless communications unit transmits instructions for both the front and rear heads to the front head cordless communications units. Instructions intended for the rear heads are then transmitted by the front head units to the rear head cordless communications units. Similarly, data from the rear heads is transmitted by the rear head units to the front head units, which in turn transmit the data to the console unit. Alternatively, the rear head cordless communications units could comprise radio transceivers for communicating directly with the console unit. In yet another embodiment of the invention, all the cordless communications units could comprise infrared transceivers. The instant invention also encompasses other combinations of various transceiver types.

The cordless communications units are attached to the heads by appropriate fasteners. Each unit comprises a cable and is electrically connected to its corresponding head by simply plugging the cable into the conventional cable connector in the head. Similarly, the console cordless communications unit comprises a cable and is electrically connected to the console by plugging the cable into a connector in the console previously used for the cable connecting the console with a head.

Thus, the cordless communications units can be used to upgrade a conventional aligner to a cordless aligner. Because the units comprise substantially fewer elements than a typical cordless head, the cost of the upgrade is significantly lower than the cost associated with replacing conventional heads with cordless heads.

These and other objects and advantages of the present invention will be made apparent from the following detailed description, with reference to the accompanying drawings.

BRIEF DESCRIPTION OF THE DRAWINGS

FIG. 1 is a diagram of a wheel aligner incorporating the cordless communications units of the present invention;

FIG. 2 is a perspective representation of a cordless communications unit of the present invention and a conventional wheel aligner head;

FIG. 3 is a block diagram of a portion of a cordless communications unit adapted for use with the front heads of a wheel aligner;

FIG. 4 is a block diagram of a portion of a cordless communications unit adapted for use with the rear heads of a wheel aligner;

FIG. 5 is a block diagram of a portion of a cordless communications unit adapted for use with the console of a wheel aligner;

FIG. 6 is a diagram of a wheel aligner incorporating a second embodiment of the cordless communications units of the present invention; and FIG. 7 is a diagram of a wheel aligner incorporating a third embodiment of the cordless communications units of the present invention.

DETAILED DESCRIPTION OF THE PREFERRED EMBODIMENTS

Referring to FIG. 1, the cordless communications units of the present invention are shown in association with a conventional wheel aligner 10. Exemplary wheel aligner 10 comprises four heads 12, 14, 16 and 18, which, in operation of wheel aligner 10, are removably mounted to the front LF, RF and rear LR, RR wheels of a vehicle by conventional means in a known manner. The heads include electronic sensors for generating signals representative of the angular orientations of the wheels. A variety of such sensors are well known in the art. Wheel aligner 10 also comprises a console 20, which typically includes a computer processor means and a video display. The processor means controls the data gathering operation through appropriate instructions transmitted to the heads, processes the data generated by the sensors and displays alignment information for the vehicle on the video display, all in accordance with pre-programmed instructions stored in a memory means accessible by the processor means. Examples of such wheel aligners are disclosed in the aforementioned Titsworth et al. patent and U.S. Pat. No. 5,208,646, which issued to Rogers et al. and is owned by the assignee hereof.

The preferred embodiment of the invention is shown in FIG. 1 to comprise five cordless communications units: a cordless communications unit 22 mounted to each front head 12, 14; a cordless communications unit 24 mounted to each rear head 16, 18; and a cordless communications unit 26 mounted to the console 20 of wheel aligner 10. Each front head unit 22 comprises radio transceiver means for communicating with similar radio transceiver means located in console unit 26. In addition, each front head unit 22 comprises infrared transceiver means for communicating with similar infrared transceiver means located in the rear head unit 24 mounted to the longitudinally adjacent rear head 16, 18. In this manner, data generated by the angle determining sensors located in rear heads 16, 18 is transmitted via the infrared transceiver means located in rear head units 24 to the infrared transceiver means located in the corresponding front head units 22, and then by the radio transceiver means located in front head units 22 to the radio transceiver means located in console unit 26. Additionally, data generated by the angle determining sensors located in front heads 12, 14 is transmitted via the radio transceiver means located in front head units 22 to the radio transceiver means located in console unit 26. Similarly, instructions from the processor means located in console 20 are transmitted via the radio transceiver means located in console unit 26 to the radio transceiver means located in front head units 22. Thereafter, instructions destined for front heads 12, 14 are transmitted to those heads, while instructions destined for rear heads 16, 18 are transmitted via the infrared transceiver means located in front head units 22 to the infrared transceiver means located in the corresponding rear head units 24 and then to the rear heads.

Referring to FIG. 2, front head unit 22 is shown to comprise a radio transceiver 28, a CPU board 30 which, as will be described hereafter, includes infrared transceiver means, and a power supply 32 mounted within a generally rectangular housing 34. Radio transceiver 28 is preferably a 2.4 GigaHertz radio transceiver, such as the model ARLAN 025 available from Telxon Corporation of Akron, Ohio and Aronet Wireless Communications, Inc. of Toronto, Canada. Radio transceiver 28 is preferably capable of communicating using spread spectrum and channel hopping technologies. Spread spectrum technology distributes the transmitted energy over a broad range of frequencies simultaneously, thereby reducing the possibility of interference from other transmissions. Channel hopping technology allows radio transceiver 28 to automatically switch to a different set of frequencies should the current band of frequencies be in use. Radio transceiver 28 also includes an antenna 36 extending from the top of housing 34 to provide for more effective communication. Radio transceiver 28 therefore provides an effective means for transmitting digital data from a front head 12, 14 to the radio transceiver means located in console unit 26 and for receiving digital instructions transmitted by the radio transceiver means located in console unit 26.

Referring now to FIG. 3, CPU board 30 is shown to comprise a microcontroller 38, such as the Philips P80C32 microcontroller; a programmable read only memory ("PROM") 40, such as the Texas Instruments TMS27C512 PROM; a dual asynchronous receiver/transmitter ("DUART") 42, such as the Philips SCC2692 DUART; and an infrared transceiver means comprising an infrared receiver 44, such as the Sharp RY5AR021 IR serial communications receiver, and an infrared transmitter 46, such as the Motorola MLED81 light emitting diode. Microcontroller 38 checks the digital instructions received by radio transmitter 28 for integrity, translates the digital instructions into a format compatible with the front head, and converts the digital data received from either the front head or the longitudinally adjacent rear head unit 24 via the infrared transceiver means into a format capable of being transmitted by radio transceiver 28, all according to pre-programmed instructions stored in PROM 40. It should be mentioned that in most conventional wheel aligners, both the front and rear heads generate data and receive instructions in a common format. Therefore, microcontroller 38 translates the digital instructions into a format compatible with both the front and rear heads, and the digital data microcontroller 38 receives from the front and rear heads is in the same format. DUART 42 functions as a two-channel serial communications device to coordinate the communication of data and instructions between microcontroller 38, the front head and the infrared transceiver means. Microcontroller 38 communicates with the front head through a first serial channel of DUART 42 and with the infrared transceiver means through a second serial channel of DUART 42. CPU board 30 also comprises associated oscillators, logic, connectors and support circuitry, which elements are not depicted in FIG. 3 but are known to those of skill in the art to which this invention pertains.

CPU board 30 thus functions to receive digital instructions from radio transceiver 28, check the instructions for integrity, translate the instructions into a format compatible with the front head and transmit the instructions to the front head or to the longitudinally adjacent rear head unit 24 via the infrared transceiver means. CPU board 30 communicates with the front head via an RS-232 bus 48, and transmits the instructions to the front head or to the rear head unit 24 via the infrared transceiver means at a rate of 31,250 bits per second. CPU board 30 also receives serial data back from the front head or the longitudinally adjacent rear head unit 24 via the infrared transceiver means, converts the data into a form compatible with radio transceiver 28, and transmits the data to radio transceiver 28 using a communications protocol dictated by radio transceiver 28. The interface between CPU board 30 and radio transceiver 28 is preferably an 8-bit parallel interface with busy in and busy out signals.

Referring again to FIG. 2, power supply 32 can be any appropriate portable power supply, such as a pair of six volt lead acid batteries. Power supply 32 is connected to radio transceiver 28 and CPU board 30 in a known manner to provide these components with the energy they may require to operate. A standard pin connector 50 allows a recharging cable from console 20 to connect to front head unit 22 when the corresponding head is stored on the cabinet of console 20. Front head unit 22 also includes an on/off switch 52, and when the unit is off and the recharging cable connected, console 20 will automatically recharge power supply 32.

Front head unit 22 is physically connected to front head 14 by any appropriate means, such as fasteners or straps. In addition, front head unit 22 may be attached to front head 14 by removing the cover 54 and fastening front head unit 22 to the head with screws 56, which correspond in location to the screws used to attach cover 54 to the head. Front head unit 22 is electrically connected to front head 14 via RS-232 bus 48, which is preferably a cable having a standard plug 58 connected to its distal end. Plug 58 fits into the standard connector 60 of front head 14 previously used for the cable connecting the console with the head.

It should be understood that rear head units 24 comprise some elements and features similar to those previously described for front head units 22. For example, each rear head unit 24 also comprises a generally rectangular housing 34, a power supply 32, a standard pin connector 50 and on/off switch 52 to facilitate recharging, and a cable 48 to electrically connect the unit to the rear head. In addition, rear head units 24 are physically connected to the rear heads in a manner similar to that used to connect front head units 22 to the front heads.

Referring to FIG. 4, each rear head unit 24 also comprises an infrared transceiver means, which in the preferred embodiment of the invention is an IR communications board 62 comprising an infrared receiver 64 similar to infrared receiver 44 and an infrared transmitter 66 similar to infrared transmitter 46. IR communications board 62 also comprises associated oscillators, logic, connectors and support circuitry, which elements are not depicted in FIG. 4 but are known to those of skill in the art to which this invention pertains. IR communications board 62 receives infrared signals containing digital instructions from the infrared transceiver means located in the longitudinally adjacent front head unit 22, converts the infrared signals into an RS-232 signal compatible with the rear head and transmits the signal to the rear head via RS-232 bus, or cable, 48. IR communications board 62 also receives digital data in the form of an RS-232 signal from the rear head, converts the data into infrared signals and transmits the infrared signals to the infrared transceiver means located in the longitudinally adjacent front head unit 22.

Referring to FIG. 5, the console unit 26 comprises a radio transceiver 68, which similar to radio transceiver 28 in front head unit 22, and a CPU board 70 comprising a microcontroller 72 similar to microcontroller 38, a PROM 74 similar to PROM 40 and a DUART 76 similar to DUART 42. CPU board 70 also comprises associated oscillators, logic, connectors and support circuitry, which elements are not depicted in FIG. 5 but are known to those of skill in the art to which this invention pertains. With the exception of the infrared transmission means of CPU board 30, CPU board 70 operates in a manner similar to CPU board 30. CPU board 70 receives digital instructions from the processor means in console 20, converts the digital instructions into a form compatible with radio transceiver 68, and transmits the digital instructions to radio transceiver 68 using a communications protocol dictated by radio transceiver 68. Radio transceiver 68 then transmits the instructions to radio transceivers 28 located in front head units 22. The interface between CPU board 70 and radio transceiver 68 is preferably an 8-bit parallel interface with busy in and busy out signals. CPU board 70 also receives digital data from radio transceiver 68, which in turn is received from radio transceivers 28 located in front head units 22, checks the data for integrity, translates the data into a format compatible with console 20 and transmits the data to console 20 through DUART 76 on one of two serial channels via one of two RS-232 buses 78.

Console unit 26 may include a portable power supply means and associated recharging components similar to those described for the front head units 28. Alternatively, console unit 26 may comprise a direct connection to the conventional power supply of console 20.

In the preferred embodiment of the invention, console 20 comprises an interface board as disclosed in applicants' copending U.S. patent application Ser. No. 07/817,250, which in effect allows wheel aligner 10 to operate in a manner similar to a conventional PC, wherein peripheral devices may be incorporated into the system simply by plugging an associated board into the system bus. In this embodiment, console unit 26 is electrically connected to the interface board through standard cable connectors.

However, it should be understood that the cordless communications units of the present invention may be used with practically any wheel aligner. To the extent the heads of such wheel aligner comprise angle determining sensors which generate data in a particular format, appropriate instructions for translating the data into a format compatible with radio transceivers 28 located in front head units 22 can be stored in PROM 40 for use by microcontroller 38. Similarly, appropriate instructions for translating the instructions from the console processor means into a format compatible with radio transceiver 68 can be stored in PROM 74 for use by microcontroller 72. The derivation of such instructions is a function that can be performed by one of ordinary skill in the art to which this invention pertains. Therefore, the present invention has broad application to wheel aligners in general.

The present invention should also be construed to cover other combinations of the above described elements. For example, referring to FIG. 6, front head units 222 and rear head units 224 are similar and each comprises a radio transceiver for communicating directly with console unit 226, which in this embodiment is similar to console unit 26. Front head units 222, and thus rear head units 224, are similar to front head units 22, with the exception that the CPU board in front head units 222 does not include the infrared transceiver means required to communicate with the rear head units 24. In another embodiment of the invention, depicted in FIG. 7, each cordless communications unit comprises infrared transceiver means instead of a radio transceiver. In this embodiment, both console unit 326 and rear head units 324 are similar to rear head units 24. Front head units 322 are similar to front head units 22, with the exception that radio transceiver 28 of front head unit 22 is replaced with an infrared transceiver means in front head unit 322. Other combinations of cordless communications units may also be derived by those skilled in the art from the above disclosure.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A method for upgrading a wheel aligner comprising at least two wheel-mountable alignment heads for generating wheel orientation data, a console including processor means for processing the data and a cable for transmitting the data from each head to the console, which comprises:

removing the cable;

providing cordless transceiver means for each head and the console;

electrically connecting the cordless transceiver means to the heads and the console to provide for communication between the heads and the console without the cable.

2. A system for upgrading a wheel aligner comprising at least two wheel-mountable alignment heads having angle sensors for generating wheel orientation data, a console including processor means for processing the data and a cable for transmitting the data from each head to the console, the system comprising:

a first unit attachable to one of the heads and including a first radio transceiver and means for coupling the first radio transceiver to the head angle sensors;

a second unit attachable to the console and including a second radio transceiver and means for coupling the second radio transceiver to the processor means;

wherein the cable is removed and the wheel orientation data is transmitted from the head to the console via the first and second radio transceivers.

3. The system of claim 2, wherein the first and second radio transceivers operate at 2.4 GigaHertz.

4. The system of claim 2, wherein the first and second radio transceivers operate using spread spectrum technology.

5. The system of claim 2, wherein the first and second radio transceivers operate using channel hopping technology.

6. In combination with a vehicle wheel aligner comprising at least two alignment heads mountable to adjacent wheels of a vehicle for generating outputs indicative of the relative orientations of the wheels, a console including processor means for computing alignment values of the vehicle from the outputs, and conventional electrical cables extending between the alignment heads and the console for transmission of the outputs, the alignment heads each having cable connectors for receiving corresponding plugs on the ends of the conventional cables, the improvement comprising:

a first retrofit unit attachable to at least one of the alignment heads;

the first retrofit unit comprising a first wireless transceiver, first means for converting the outputs into signals capable of being transmitted by the wireless transceiver, and a cable for connecting the first converting means to the head through the cable connector;

a second retrofit unit attachable to the console;

the second retrofit unit comprising a second wireless transceiver in wireless communication with the first wireless transceiver, second means for converting the signals received by the second wireless transceiver into data capable of being processed by the processor means, and a cable for connecting the second converting means to the console;

wherein the conventional cables are removed and the outputs are instead communicated to the console by means of the wireless transceivers.

\* \* \* \* \*